Feb. 27, 1962   B. W. ROWLEY   3,022,686
CUTTING TOOL
Filed Jan. 4, 1960
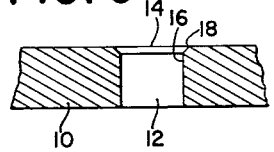
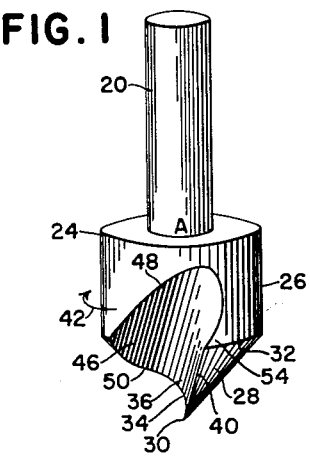
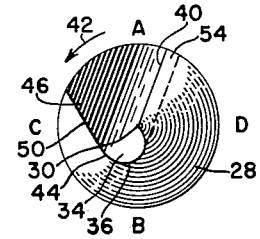
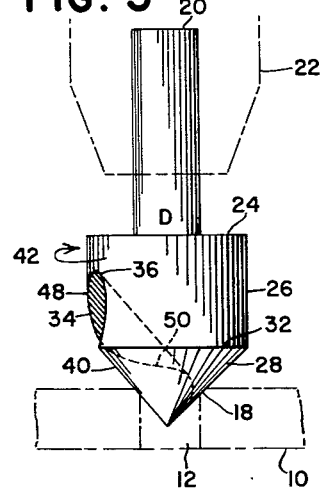
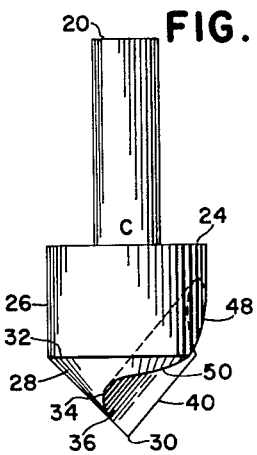
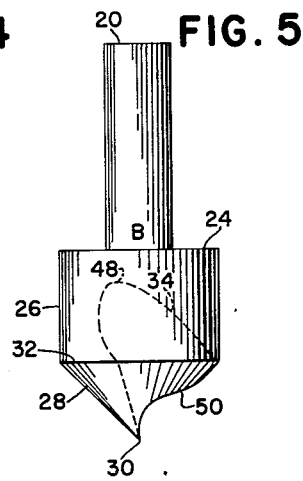
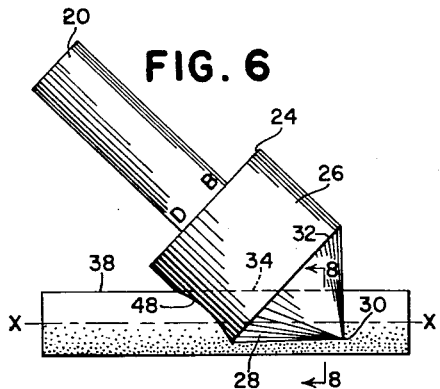
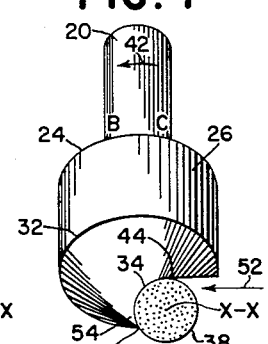
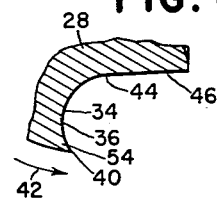
INVENTOR.
B. W. ROWLEY
ATTORNEY

United States Patent Office
3,022,686
Patented Feb. 27, 1962

3,022,686
CUTTING TOOL
Benjamin W. Rowley, Davenport, Iowa, assignor, by mesne assignments, to Jancy Engineering Company, Davenport, Iowa, a corporation of Iowa
Filed Jan. 4, 1960, Ser. No. 170
2 Claims. (Cl. 77—73.5)

This invention relates to a cutting tool and more particularly to a tool having special utility in the performance of chamfering, countersinking and like operations.

Chamfering, countersinking, etc. tools have heretofore been known, the main purpose of which is to form an annular chamfer around an opening in metal and other materials. The basic design of such tool necessarily involves a conical or equivalently pointed tip having one or more cutting edges thereon, the angle of the surface of the tip to the rotating axis of the tool determining, of course, the angle of the chamfer or countersink. These tools have at least one major defect in common; that is, they tend to distort the material around the opening as an adjunct to the chamfering operation. For example, chamfering with such tools ordinarily involves forcing of some of the material down into the hole, requiring that the hole be subsequently dressed or finished to remove the burr. In other cases, material will be forced outwardly onto the surface around the chamfer, again requiring further operation before the material can be considered as finished.

According to the present invention, these difficulties and disadvantages are eliminated by the provision of a novel tool having therein a groove which forms a cutting edge generally coincident with an element of the cone on which the cutting tip or head is formed. The feature of the groove is that it is substantially semicircular in shape about an axis parallel to the cutting edge, and the remainder of the groove extends away from the semicircular portion, interiorly of the cutting edge, as a flat surface providing adequate relief to accommodate chips, etc. resulting from the chamfering or countersinking operation. Another feature of the design is that the cutting edge is formed on a portion of the cone that establishes an overhanging lip relative to the groove; that is, the lip overhangs the groove in a leading direction as respects the normal direction of rotation of the tool. An important feature of the design is that the shape of the groove is such as to lend itself to ready sharpening, honing and dressing, since, being of generally semicylindrical or regular shape, it may be ground by a cylindrical wheel. In this respect, the portion of the surface that extends away from the semicircular surface portion is flat so that the grinding wheel or other tool can be moved directly into intersecting relationship with the cone in a plane lying at an angle to the axis of the cone and including the axis of the semicylindrical surface. The length of the groove is such that it opens at one end to the surface of the cone adjacent to the apex and opens at its other end to the base of the cone. The design features a construction in which the cone is formed coaxial with a cylindrical portion of the head, in which case the groove opens at the cylindrical surface just below or beyond the base of the cone.

The foregoing and other important objects and desirable features inherent in and encompassed by the invention will become apparent as a preferred embodiment thereof is disclosed, by way of example, in the ensuing specification and accompanying sheet of drawings, the several figures of which are described below.

FIGURE 1 is a perspective of the tool.

FIGURE 2 is an end view as seen from the bottom of FIGURE 1, the view being labeled at 90° intervals with the letters A, B, C, and D for purposes of clarification of the other views.

FIGURE 3 is an elevation as seen from the direction D in FIGURE 2.

FIGURE 4 is an elevation as seen from the direction C in FIGURE 2.

FIGURE 5 is an elevation as seen from the direction B in FIGURE 2.

FIGURE 6 is a view of the tool in association with a cylindrical member by means of which it may be sharpened or dressed.

FIGURE 7 is a front view of the arrangement shown in FIGURE 6.

FIGURE 8 is an enlarged fragmentary section taken generally on the line 8—8 of FIGURE 6 but omitting the cylindrical grinding or dressing member.

FIGURE 9 is a sectional view showing a typical hole with a chamfer formed thereon.

The invention may best be understood by preliminary reference to FIGURE 9 for purposes of explaining the environment. In that figure, the numeral 10 represents a workpiece, such as metal or the like, in which a hole 12 has been previously drilled. The top surface of the plate or workpiece around the hole 12 is chamfered at 14 to provide an annular conical surface. In the present case, the angle of the cone on which the surface 14 is formed is 45°; although, this is for reference only and is not to be regarded as a limitation.

The principal detriment encountered in the use of prior tools is that axial pressure on the tool, required because of inherent defects in the tool design, quite often causes material to be rolled down at the side of the hole 12, generally in the area indicated at 16. This of course forms a burr within the hole, which must be removed by a subsequent finishing operation. Another disadvantage encountered is the rolling of material back at the top edge of the chamfer, generally in the area indicated at 18. Here again, a burr is formed which must be removed by a subsequent operation. According to the present invention, these disadvantages are eliminated and the tool is capable of producing finely finished chamfers, countersinks and equivalent annular bevels.

The tool is of simple but accurate design and includes a holder-receiving portion 20 in the form of a shank which may be received by any typical rotating tool holder, such as a chuck, suggested at 22 in FIGURE 3. The shank 20 is integral or otherwise rigid with a head 24 which is coaxial, of course, with the shank on the axis of rotation and which is here made up of a cylinder 26 and a terminal pointed end or tip primarily in the form of a cone 28. The altitude of the cone is of course coincident with the rotating axis of the tool and the angle of the surface of the cone to this altitude is determined by the angle of the chamfer for the formation of which the tool is designed. It will be appreciated that different cone angles will be provided for different chamfer angles and in this respect a relatively wide range of angles may be encountered.

The apex of the cone, indicated at 30 for reference purposes, is of course the terminal tip of the tool. It is further fundamental that a cone is made up of an infinite number of elements extending from the apex to the base of the cone. In this case, the base of the cone is the junction between the cylinder 24 and the cone 28, represented by a primarily circular line 32.

To the extent described, the tool forms the pattern generally followed in countersinking and chamfering tools; namely, the shank and the conical end 28. However, at this point the tool departs from conventional construction by having therein a groove 34 which is formed in a novel manner and which has a novel shape. The groove is made up of a pair of surfaces, one of which is a generally semicylindrical surface 36 formed about an axis that is generally parallel to an element of the cone. The surface 36 is the semicylindrical section of a cylinder of relatively small diameter, which will be best appreciated from an examination of FIGURES 6 and 7, wherein the numeral 38 represents, for example, a cylindrical grinding wheel rotatable about an axis X—X. In the original production of tools of this character, the groove will of course be formed by an appropriate milling cutter or its equivalent but in any event the ultimate shape of the groove and its relationship to the geometrical components of the cone and cylinder will be as described. The surface 36 of cylindrical section, when cutting the surface of the cone 28, does so in such manner as to provide on the cone a cutting edge 40 which is coincident with the element to which the axis, as at X—X, is parallel. As best seen in FIGURES 2 and 8, the surface 36 curves beneath the cutting edge 40 in a trailing direction as respects the normal direction of rotation of the tool, which is indicated by the arrow 42. The curvature is then such that the surface 36 extends toward the base of the cone and then laterally outwardly to what may be regarded as a line 44 substantially diametrically opposed to the cutting edge 40 as respects the axis on which the surface 36 is formed. In this area, the groove 34 is completed by a continuation flat surface 46 which meets or is tangent to the surface 36 along the line 44 and which extends outwardly to cut the cone 28 and cylinder 26 along a line 48 which, because of the nature of the construction, is a hooked curve as best shown in FIGURE 1. The configuration of the line 48 establishes that end of the groove 34 which opens at the cylinder 26. The opposite end of the groove opens at the surface of the cone along a reversely curved line 50. In the end view of the tool, as seen in FIGURE 2, the major portion of the line 50 will appear to be substantially straight; although, when viewed in elevation, as in FIGURES 3, 4 and 5, the line 50, following the conical surface and then curving back to the apex 30 to follow the cylindrical surface 36 will definitely show the reverse curvature just referred to.

As previously described, the groove 30 may be formed by causing the cone 28 and cylinder 26 to be intersected by means providing a cylinder of relatively small diameter as compared to the diameter of the base of the cone, which cylinder cuts the surfaces of the cone and cylinder to form the groove 34, having the configuration already noted. The path of movement of the milling tool or grinder which forms the groove will be along a plane including the axis of the cylinder and this axis will be parallel to the cutting edge 40, or substantially so. This will distinguish a structure in which the axis of the forming cylinder is in a plane including the axis of the tool. In the present case, the axis of the forming cylinder will be at an angle to the axis of the tool. Regarded otherwise, the groove is in the form of a reversed J, the flat surface 46 forming the leg of the J and the cylindrical surface 36 forming the hook of the J. Thus, the groove is open laterally at one side of the cone so as to permit the easy formation thereof. This relationship also establishes ease of grinding, which is best illustrated in FIGURES 6 and 7, which shows that the grinding wheel or element 38 may be moved into the groove in the direction of the arrow 52 and, while in the groove, may be rotated to dress the surface 36 and at the same time to sharpen the cutting edge 40. When the grinding operation is finished, the grinding element may be moved out in the direction opposite to that shown by the arrow 52.

Another feature of the invention is that the curvature 36 extends in a trailing direction beneath the cutting edge 40, thus affording on the tool an overhanging lip 54 which of course terminates along the cutting edge 40. This gives the tool substantial strength in a critical zone and the curvature 36, along with the remainder of the groove, affords adequate relief and clearance for the proper operation of the tool, enabling the easy elimination of chips, fragments, etc.

Features and advantages other than those herein enumerated will readily occur to those versed in the art, as will many modifications and alterations in the preferred embodiment disclosed, all of which may be achieved without departure from the spirit and scope of the invention.

What is claimed is:

1. A cutting tool having a holder-receiving portion to mount the tool for normal rotation in one direction and further having a head coaxial with said portion on the axis of rotation, said head being primarily in the form of a cone on said axis and having a terminal pointed apex, said head having therein a single groove cutting the surface of the cone and lying generally parallel to an element of the cone, said groove having a semicylindrical surface formed about an axis generally parallel to said element and interiorly of the surface of the cone, said groove surface intersecting the cone surface at said element to provide a leading cutting edge along said element, said groove surface extending thence beneath said cutting edge and in a trailing direction as respects the normal direction of rotation of the tool and curving thence toward the base of the cone and thence in a leading direction to a line paralleling said edge and diametrically opposite said edge as respects the axis of said groove surface, and said groove further having a flat surface tangent to said semicylindrical surface at said line and extending away from said line to cut the surface of the cone along a line spaced angularly from the cutting edge in a leading direction as respects the normal direction of rotation of the tool, and said groove opening at one end to the surface of the cone at the opposite side of the apex from said element and opening at its other end at the base of the cone.

2. A cutting tool having a holder-receiving portion to mount the tool for normal rotation in one direction and further having a head coaxial with said portion on the axis of rotation, said head comprising a cylinder on said axis and a coaxial cone having a terminal pointed apex, said head having therein a single groove extending from the apex of the cone back to the cylinder and opening at its opposite ends respectively adjacent to said apex and at the surface of said cylinder and lying essentially along an axis generally parallel to an element of the cone and interiorly of the surface of the cone, said groove having a semicylindrical surface formed about said axis of the groove and intersecting the cone surface at said element to provide a leading cutting edge along said element, said groove surface extending thence beneath said cutting edge and in a trailing direction as respects the normal direction of rotation of the tool and curving thence toward the base of the cone and thence in a leading direction to a line paralleling said edge and diametrically opposite said edge as respects the axis of said groove surface, and said groove further having a flat surface tangent to said semicylindrical surface at said line and extending away from said line to cut the surface of the cone and the surface of the cylinder along a line spaced angularly from the cutting edge in a leading direction as respects the normal direction of rotation of the tool.

References Cited in the file of this patent

FOREIGN PATENTS 124,536     Australia _____ May 29, 1945